United States Patent [19]
LeJeune

[11] 3,765,469
[45] Oct. 16, 1973

[54] DEVICE FOR FILLING TUBELESS TIRES WITH A LIQUID

[75] Inventor: Daniel LeJeune, Clermont-Ferrand, France

[73] Assignee: Compagnie Generale des Etablissements Michelin, raison sociale Michelin & Cie, Clermont-Ferrand (Puy-de-Dome), France

[22] Filed: Feb. 3, 1972

[21] Appl. No.: 223,173

[30] Foreign Application Priority Data

Feb. 8, 1971 France.......................... 7104192

[52] U.S. Cl............................ 152/415, 152/DIG. 5
[51] Int. Cl. ........................ B60c 29/00, F16k 21/00
[58] Field of Search..................... 152/427, 415-431, 152/DIG. 5, DIG. 11

[56] References Cited
UNITED STATES PATENTS

| | | | |
|---|---|---|---|
| 2,320,042 | 5/1943 | McMahan...................... | 152/DIG. 5 |
| 2,400,969 | 5/1946 | Baker............................ | 152/DIG. 5 |
| 1,406,380 | 2/1922 | Heath et al. .................... | 152/DIG. 5 |
| 2,339,381 | 1/1944 | Crowley......................... | 152/DIG. 5 |
| 2,311,901 | 2/1943 | Palko............................. | 152/DIG. 5 |
| 2,237,207 | 5/1941 | Zimmerman.................... | 152/DIG. 5 |
| 1,307,173 | 6/1919 | Anthony......................... | 152/DIG. 5 |

Primary Examiner—Gerald M. Forlenza
Assistant Examiner—Richard A. Bertsch
Attorney—Granville M. Brumbaugh, et al.

[57] ABSTRACT

A device is provided for filling with water the space enclosed within a wheel rim and a tubeless tire mounted on the rim. A removable coupling is mounted in the usual valve opening formed in the wheel rim and is adapted to be connected to a source of water under pressure. An air-exhaust tube is slidable through the coupling in air-tight relation thereto. A first end of the air-exhaust tube is inserted into the enclosed space and a second end remains outside the enclosed space. The air-exhaust tube comprises at the first end a removable tip which forms an inlet into the air-exhaust tube for exhausting air from the enclosed space as water is introduced into the enclosed space. The tip is then withdrawn into the valve opening, which it temporarily seals by means of an O-ring while the coupling and air-exhaust tube are removed and until mounting of a conventional valve in the valve opening.

6 Claims, 4 Drawing Figures

PATENTED OCT 16 1973

3,765,469

DEVICE FOR FILLING TUBELESS TIRES WITH A LIQUID

BACKGROUND OF THE INVENTION

This invention relates to novel and highly-effective means for filling tubeless tires with a liquid, particularly tubeless tires for agricultural or construction equipment.

The filling of tube-type tires with liquid is easy. It is sufficient to evacuate the inner tube of air by flattening it before filling it with water under pressure.

This method cannot be used in the case of tires which have no inner tube: Air cannot be evacuated from such a tire without loosening the beads on the rim, thus placing the inside of the tire in communication with the atmosphere. Even if this loosening were avoided by effecting a very strong clamping of the beads on the rim, sufficient removal of air would cause an undesirable and harmful deformation of the tire. The filling of tubeless tires therefore requires that the air contained in the tire be evacuated as the tire is filled with water.

The known devices for simultaneously effecting the removal of air and the introduction of water in a tubeless tire have the drawback of not permitting a complete filling with water: Either all the air is not removed or else it is not possible to avoid a leakage of water and a loss of pressure at the end of the operation.

SUMMARY OF THE INVENTION

An object of the invention is to overcome the problem outlined above. In particular, an object of the invention is to provide a device assuring the complete filling of tubeless tires with water under the required pressure.

The foregoing and other objects are attained in accordance with the invention by the provision of a filling device comprising a removable coupling which is fastened to a valve mount in place of the usual valve. The valve mount is permanently fastened to the wheel rim in the usual manner. The removable coupling can be connected to a source of water under pressure. An air-exhaust tube is mounted for sliding movement in an airtight manner through the removable coupling, so that one end of the air-exhaust tube is inside the tire and the other end is outside the tire. The device is characterized in that the air-exhaust tube comprises, at the end thereof penetrating into the tire, a removable tip forming an air intake provided with a seal capable of hermetically closing the valve after removal of the air-exhaust tube and the removable coupling and until replacement of the removable coupling by the normal valve.

In one embodiment, the tip has a thread for removable attachment to the air-exhaust tube, a blind bore hole connected to radial ports, and, beyond the radial ports, a peripheral groove in which an annular seal is placed preferably without play.

The principle of the invention can be readily understood. During the filling with water, the air-exhaust tube and its removable tip gradually assure the removal of the air. When the tire is filled with water, the tube is withdrawn, the tip remaining in the valve seat and being then separated from the tube. One can then unscrew the removable coupling and replace it by a normal valve the insertion of which in the valve mount causes the tip to be expelled into the inside of the tire. The use and subsequent removal of the filling device are operations which result neither in the entrance of air nor in the loss of water, this result being obtained at the cost of a small, very inexpensive sealing member which is sacrificed in order to carry out the filling operation.

BRIEF DESCRIPTION OF THE DRAWING

An understanding of other aspects of the invention can be gained from a consideration of the following detailed description of the preferred embodiment thereof, in conjunction with the appended figures of the drawing, wherein.

DESCRIPTION OF THE PREFERRED EMBODIMENT

Figure 1:
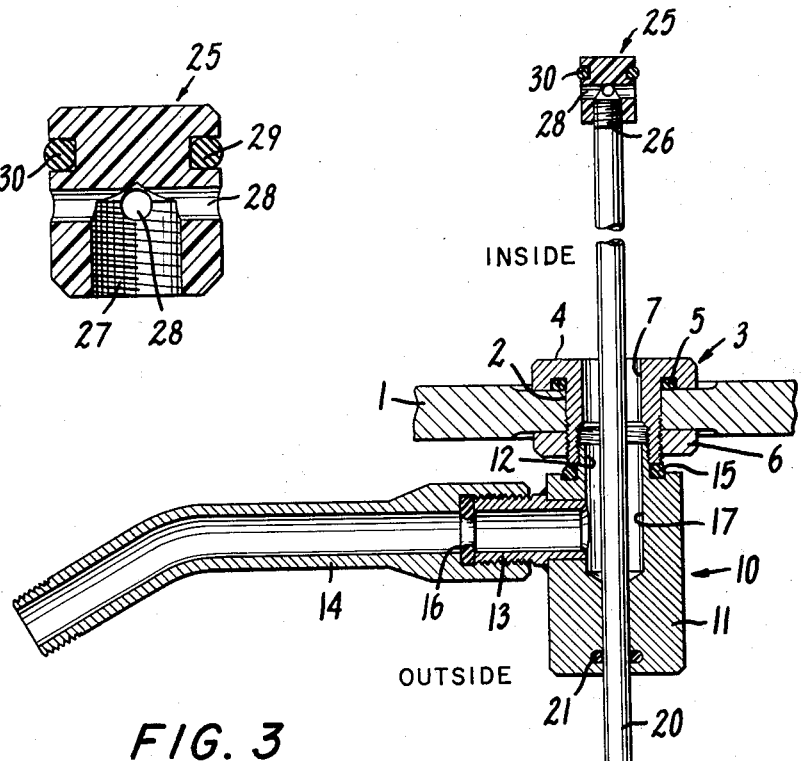
FIG. 1 is a view in radial section of the preferred embodiment of a filling device constructed in accordance with the invention.

FIG. 1 shows the entire filling device. The wheel rim 1 is pierced with a hole 2 in which there is fastened a valve mount 3 forming a valve opening 7 and comprising three parts: a body 4, a gasket 5 and a nut 6.

On the mount 3 there is fastened a removable filling coupling 10. The coupling 10 comprises a cylindrical body 11 terminating in a threaded head 12 which is screwed into the inside of the mount 3, and a lateral branch 13 intended to receive a fitting 14 which can be connected to a source of water under pressure or to a source of air under pressure. Gaskets 15 and 16 ensure tightness between the filling coupling 10 and the mount 3 on the one hand and the fitting 14 on the other hand.

Within the coupling 10 there is arranged an air-exhaust tube 20. For this purpose the coupling 10 is pierced by a bore 17 the diameter of which is definitely greater than that of the tube between the head 12 and the branch 13 and is close to that of the tube below the branch. An O-ring 21 placed in an annular groove permits the tube 20 to slide hermetically in the coupling 10.

At its lower end (the end outside the space enclosed between the wheel rim and the tire mounted thereon—labeled "outside" in FIG. 1) the tube 20 has a valve nose 22 which makes it possible as desired to place the inside of the tube in communication with the atmosphere and also to connect a pressure gauge (not shown).

Figure 2:
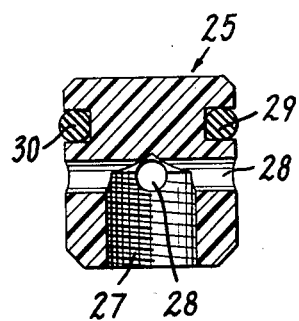
FIG. 2 is a fragmentary view in radial section, on a larger scale, of a tip portion of the device.

At its upper end (the end inside the space enclosed between the tire and rim--labeled "inside" in FIG. 1) the tube 20 has a thread 26 on which there is screwed a removable tip 25. As FIG. 2 shows, this tip has an axial blind bore hole 27 with which there communicate four radial ports 28. It also has an annular groove 29 beyond the radial ports 28 in which an O-ring 30 is placed without play. The outer diameter of the tip 25 is equal to or within 0.1 mm less than the inside diameter of the mount 3. This tip can advantageously be made of plastic, for instance polyamide.

Figure 3:
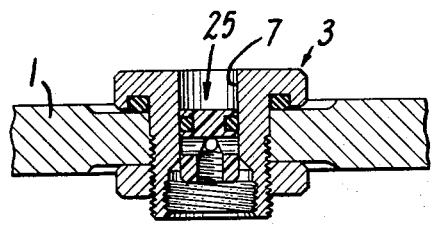
FIG. 3 is a fragmentary view in radial section, on a different scale, of the tip portion of FIG. 2 sealing the valve opening after the removal of the remainder of the device.

FIG. 3 shows the tip 25 closing off the opening 7 in the mount 3 after the removal and unscrewing of the tube 20 and of the filling coupling 10.

Figure 4:
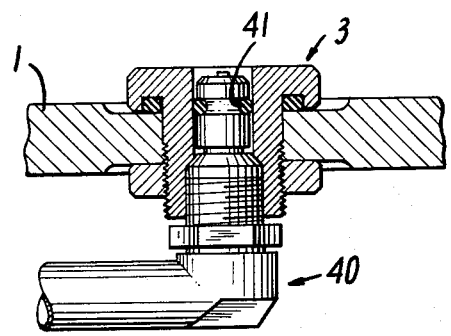
FIG. 4 is a view in radial section, on the same scale as FIG. 3, of the valve after expulsion of the tip portion of the filling device.

FIG. 4 shows, on the same scale as FIG. 3, the mount 3 with the normal valve 40 in position. The placing in position thereof has caused the expulsion of the tip 25, the O-ring 41 of the valve 40 replacing the O-ring 30 of the tip 25 to ensure tightness.

The use of the device in accordance with the inventon can take place in the following manner:

First, the tire is mounted on the wheel, the valve 40 being in place, and it is then inflated to permit the beads of the tire to position themselves properly on the rim.

The tire is then deflated, the valve 40 is unscrewed and the ballasting coupling 10 provided with its tube 20 is then grasped. The tip 25, the O-ring 30 of which is lubricated, is threaded onto the end of the tube 20. The tip 25 is then pushed into the inside of the tire via the mount 3. The filling coupling 10 is then screwed onto the mount 3.

The filling apparatus being in place, a pressure gauge provided with a discharge valve is then placed on the valve nose 22 of the tube 20 and the tire is partially inflated through the fitting 14 to an air pressure of about 0.5 bar, in order to prevent the subsequently added water from loosening the beads from the rim. The tip 25 is then brought into the valve opening 7 of the mount 3 to ensure tightness during the replacement of the fitting 14 for air inflation by a similar fitting connected to a source of water. The tube 20 is then pushed into the tire up to the highest point of the tire, the tube being vertical.

The filling with water is then effected. As the filling is effected, the air is allowed to escape gradually by means of the escape valve of the pressure gauge but without allowing the air pressure to drop below 0.5 bar as long as the tire is not practically full. The ballasting is complete when, the tip 25 being in contact with the tube and the tube 20 being vertical, only water and no air escapes any longer through the tube 20. The water pressure is then allowed to increase to 2 or 3 bars and the filling is stopped.

The device is then removed. To do this, the tube 20 is pulled until the tip 25 is in the mount 3. The pressure in the water filling tube is then allowed to drop. The tube 20 is removed from the tip 25 by unscrewing. The tube 20 and then the filling coupling 10 are removed. The tip 25 remains in the mount 3, temporarily sealing the valve opening 7.

It is now merely necessary to remount the valve 40, which expels the tip 25 into the tire, and to place the filling water under the desired pressure by connecting the valve 40 to the water supply.

Experience has shown that the tip 25 placed in the mount 3 can withstand a pressure of 7 bars, provided that the O-ring 30 is mounted without play.

Thus there is provided in accordance with the invention a novel and highly-effective means for filling tubeless tires with a liquid. Many modifications of the preferred embodiment disclosed herein will readily occur to those skilled in the art upon study of this disclosure. For example, the device of the invention can be used with other types of valves and valve mounts. Accordingly, the invention is to be construed as including all embodiments thereof within the scope of the appended claims.

I claim:

1. A device for filling with water the space enclosed between a wheel rim having a valve opening for the mounting of a valve and a tubeless tire mounted on said wheel rim, comprising a removable coupling adapted to be mounted in said valve opening in place of said valve and also to be connected to a suource of water under pressure and an air-exhaust tube slidable through said coupling in air-tight relation thereto and having a first end for insertion into said enclosed space and a second end remaining outside said enclosed space, characterized in that said air-exhaust tube comprises at said first end a removable tip which forms an inlet into said air-exhaust tube for exhausting air from said enclosed space as water is introduced into said enclosed space and in that said air-exhaust tube can be slid within said coupling to move said tip into said valve opening, the outside diameter of said tip having a value within the range defined by the inside diameter of said valve opening and a diamter 0.1 mm less than the inside diameter of said valve opening, further comprising sealing means sealing said valve opening when said removable tip is therein, whereby, after water is introduced into said enclosed space and air is evacuated therefrom, said tip can be made to cause temporary sealing of said valve opening while said coupling and air-exhaust tube are removed and until mounting of a conventional valve in said valve opening.

2. A device according to claim 1 wherein said tip is made of plastic.

3. A device for filling with water the space enclosed between a wheel rim having a valve opening for the mounting of a valve and a tubeless tire mounted on said wheel rim, comprising a removable coupling adapted to be mounted in said valve opening in place of said valve and also to be connected to a source of water under pressure and an air-exhaust tube slidable through said coupling in air-tight relation thereto and having a first end for insertion into said enclosed space and a second end remaining outside said enclosed space, characterized in that said air-exhaust tube comprises at said first end a removable tip which forms an inlet into said air-exhaust tube for exhausting air from said enclosed space as water is introduced into said enclosed space and in that said air-exhaust tube can be slid within said coupling to move said tip into said valve opening, further comprising a threaded connection for removably connecting said tip to said air-exhaust tube and sealing means sealing said valve opening when said removable tip is therein, whereby, after water is introduced into said enclosed space and air is evacuated therefrom, said tip can be made to cause temporary sealing of said valve opening while said coupling and air-exhaust tube are removed and until mounting of a conventional valve in said valve opening.

4. A device for filling with water the space enclosed between a wheel rim having a valve opening for the mounting of a valve and a tubeless tire mounted on said wheel rim, comprising a removable coupling adapted to be mounted in said valve opening in place of said valve and also to be connected to a source of water under pressure and an air-exhaust tube slidable through said coupling in air-tight relation thereto and having a first end for insertion into said enclosed space and a second end remaining outside said enclosed space, characterized in that said air-exhaust tube comprises at said first end a removable tip which forms an inlet into said air-exhaust tube for exhausting air from said enclosed space as water is introduced into said enclosed space and in that said air-exhaust tube can be slid within said coupling to move said tip into said valve opening, further comprising sealing means sealing said valve opening when said removable tip is therein, whereby, after water is introduced into said enclosed space and air is evacuated therefrom, said tip can be made to cause temporary sealing of said valve opening while said coupling and air-exhaust tube are removed and until mounting of a conventional valve in said valve opening, said tip being formed with an axial blind bore and with radial ports in communication with said axial blind bore.

5. A device according to claim 4 wherein said tip is formed with a peripheral annular groove beyond said radial ports and wherein said sealing means comprises an O-ring mounted in said groove.

6. A device according to claim 5 wherein the geometrical characteristics of said O-ring and said groove are such that there is no play between them.

* * * * *